United States Patent Office 3,830,858
Patented Aug. 20, 1974

3,830,858
ISOMERISATION PROCESS
Peter John Nicholas Brown, Epsom, and Clifford William Capp, Ewell, England, assignors to BP Chemicals International Limited, London, England
No Drawing. Filed Dec. 8, 1971, Ser. No. 206,187
Claims priority, application Great Britain, Jan. 11, 1971, 1,157/71
Int. Cl. C07c 21/04
U.S. Cl. 260—654 R                13 Claims

ABSTRACT OF THE DISCLOSURE

Dichlorobutenes are isomerised by contacting them with a catalyst composition comprising a copper compound and an organic phosphorus compound.

---

The present invention relates to a process for the preparation of 3,4-dichlorobutene-1 by the isomerisation of 1,4-dichlorobutene-2 or 1,4-dichlorobutene-2 by the isomerisation of 3,4-dichlorobutene-1.

The dichlorobutene obtained by the chlorination of butadiene is a mixture of the isomeric compounds 1,4-dichlorobutene-2 and 3,4-dichlorobutene-1, comprising approximately 60% of the former and about 40% of the latter. These two isomers usually exist in equilibrium in the mixture, the proportion depending on the conditions of preparation.

The usual methods of isomerising 1,4-dichlorobutene-2 to 3,4-dichlorobutene-1 or 3,4-dichlorobutene-1 to 1,4-dichlorobutene-2 consist of heating the mixed isomers with one or more of copper, iron, zinc, titanium, aluminium, zirconium, etc., metal salts as catalysts or heating the isomers in the absence of catalysts. Whichever process is used for the isomerisation the rate of conversion is undesirably slow, high temperatures are required to get useful yields of the right isomer, and some unwanted by-products are formed.

It has now been found that the use of catalysts of specific compositions appreciably accelerates the rate of the isomerisation reactions.

According to the present invention a process for the isomerisation of 1,4-dichlorobutene-2 to 3,4-dichlorobutene-1 or for the isomerisation of 3,4-dichlorobutene-1, to 1,4-dichlorobutene-2 comprises contacting the compounds to be isomerised with a catalyst composition comprising one or more compounds of copper and an organic phosphorus compound.

The organic phosphorus compound in the catalyst composition of the present invention may be an aliphatic, alicyclic or aromatic substituted phosphorus compound. Suitable examples of such compounds are di- and tri-aryl or alkyl phosphites, phosphates, phosphine oxides, phosphonates and phosphines. Specific examples illustrating the preferred class of compounds include triphenyl phosphite, triethylphosphite, triallyl phosphite, tri-isopropyl phosphite, dimethyl phosphite, diethyl phosphite, triethyl phosphate, tributyl phosphate, tributyl phosphite, diphenyl phosphite, triphenyl phosphine oxide, diethylethyl phosphonate, diethyl phosphate, triphenyl phosphine and tributyl phosphine oxide.

The compounds of copper that may be used in carrying out the process of the present invention include both organic and inorganic salts or complexes of copper. Suitable examples are the halides, acetates and naphthenates of copper, e.g. cuprous chloride, cupric chloride, cupric acetate and cupric naphthenate. Of these, cupric naphthenate is preferred since it has a high solubility in dichlorobutenes.

The amount of the organic phosphorous compound present in the catalyst composition of the present invention may vary over a moderately wide range of between 0.5 and 10% by weight of the total composition consisting of catalyst and dichlorobutene.

The isomerisation reaction of the present invention may be carried out between temperatures of 80° and 160° C. preferably between 100° and 130° C. at atmospheric, super atmospheric or sub-atmospheric pressures.

The process of the present invention may be performed by using a batch process or a continuous process. It is preferable to carry out the process continuously. If it is desired to convert 1,4-dichlorobutene-2 to 3,4-dichlorobutene-1, the former or the direct chlorination product of butadiene previously described is fed continuously to a reactor which contains the catalyst. This is heated and pure 3,4-dichlorobutene-1 distilled off through a fractionating column. The apparatus is preferably maintained under reduced pressure because it is neither necessary nor desirable to conduct the reaction at the normal boiling point of the dichlorobutenes and distillation can take place from the reactor itself. Since 3,4-dichlorobutene-1 has a lower boiling point than 1,4-dichlorobutene-2 the equilibrium of the reaction is displaced in favour of the former and all the 1,4-dichlorobutene-2 which is fed to maintain a constant level in the reactor, is thus converted to 3,4-dichlorobutene-1. It should be noted that there is no loss of catalyst in the 3,4-dichlorobutene-1 distilled off. However, since a very small proportion of the dichlorobutenes is converted to high boilers, it is necessary to remove a small stream from the reactor as liquid to prevent accumulation of the high boilers. This stream is subjected to separate distillation to recover the dichlorobutene content which is then recycled to the reactor. In this operation the catalyst is left in the high boiler stream and so a very small make-up of catalyst may have, in practice, to be added to the reactor. This should be sufficient to maintain the preferred reaction rate.

In the alternative case, where it is desired to convert 3,4-dichlorobutene-1 to 1,4-dichlorobutene-2, the mixed dichlorobutenes are again fed to a continuous retactor system as previously described but in this case, in order to separate the 1,4-dichlorobutene-2 a liquid stream is taken from the reactor to the appropriate point near the base of a fractionating column, not attached to the reactor, and provided with its own reboiler. 3,4-Dichlorobutene-1 is removed from the head of the column and recycled back to the reactor and 1,4-dichlorobutene-2 vapour removed near the base of the column but below the feed point. The catalyst containing stream from the reboiler of the column is returned to the reactor, a suitable proportion being removed for separate distillation, to prevent accumulation of high boilers in the reactor. A regular addition of catalyst to the reactor is made to replace that which is removed and to maintain the reaction rate.

The process of the present invention is further illustrated by the following examples.

EXAMPLES

The catalysts used in the following examples were either (i) 3 parts of cupric naphthenate (a commercial product containing 5% w./w. Cu metal) or (ii) 0.5 part of cuprous chloride. The catalyst and an additive (3 parts) as shown in the Table below were added to 1,4-dichlorobutene-2 (100 parts). The mixture was heated very quickly to 120° C. and, at various times, samples were removed and analysed by gas phase chromatography. From the plot of conversion to 3,4-dichlorobutene-1 against time, the conversion after 90 minutes was measured.

The results of these experiments are shown in the Table I.

TABLE I

| Example number | Catalyst | Additive (3%) | Percent conversion after 90 min. |
|---|---|---|---|
| 1 | Cuprous chloride (0.5%) | Triphenylphosphite | 21.2 |
| 2 | Cupric naphthenate (3%) | do | 20.3 |
| 3 | Cuprous chloride (0.5%) | Triethylphosphite | 17.8 |
| 4 | Cupric naphthenate (3%) | do | 15.5 |
| 5 | Cuprous chloride (0.5%) | Triisopropylphosphite | 16.6 |
| 6 | Cupric naphthenate (3%) | do | 16.2 |
| 7 | Cuprous chloride (0.5%) | Triallylphosphite | 15.9 |
| 8 | Cupric naphthenate (3%) | do | 14.4 |
| 9 | Cuprous chloride (0.5%) | Dimethylphosphite | 18.1 |
| 10 | Cupric naphthenate (3%) | do | 19.6 |
| 11 | Cuprous chloride (0.5%) | Diethylphosphite | 17.6 |
| 12 | Cupric naphthenate (3%) | do | 18.9 |
| 13 | Cuprous chloride (0.5%) | Diphenylphosphite | 15.2 |
| 14 | Cupric naphthenate (3%) | do | 16.5 |
| 15 | Cuprous chloride (0.5%) | Triphenylphosphine oxide | 21.8 |
| 16 | Cupric naphthenate (3%) | do | 23.6 |
| 17 | Cuprous chloride (0.5%) | Diethylethylphosphonate | 18.9 |
| 18 | Cupric naphthenate (3%) | do | 22.3 |
| 19 | Cuprous chloride (0.5%) | Diethylphosphate | 16.4 |
| 20 | Cupric naphthenate (3%) | do | 17.2 |
| 21 | Cuprous chloride (0.5%) | Tributylphosphine oxide | 19.5 |
| 22 | do | Triethyl phosphate | 19.1 |
| 23 | do | Tributyl phosphate | 17.3 |
| 24 | do | Tributyl phosphite | 15.5 |
| 24A [1] | do | None | [2] 3.3 |
| 24B [1] | Cupric naphthenate (3%) | do | [2] 13.7 |

[1] Comparative tests. [2] Average value.

EXAMPLE 25

Continuous Isomerisation of 1,4-Dichlorobutene-2 into 3,4-Dichlorobutene-1

1,4-Dichlorobutene-2 (99.1%: cis/trans ratio=0.33) was pumped continuously at 175 ml./hr. into a glass reactor containing 700 ml. 1,4-dichlorobutene-2, 3% triphenyl phosphite and cupric naphthenate (initially 700 p.p.m. Cu in solution) boiling at 110±2° C. (ca. 180 mm. Hg). The reactor was reacted by two side-arm immersion heaters which gave rapid circulation of the contents of the reactor. The heat input was automatically controlled to keep the volume of liquid in the reactor constant, i.e., mixed dichlorobutenes were distilled off at 175 ml./hr. (a rate equal to the feed rate). The amount of copper in solution was monitored. This tended to fall during the experiment and further cupric naphthenate was added from time to time to maintain a level of ca. 375 p.p.m. Cu in solution.

From analyses (gas chromatography) of the dichlorobutenes distilled off, the rate of isomerisation of 1,4-dichlorobutene-2 into 3,4-dichlorobutene-1 was calculated.

A second continuous experiment was performed exactly as above (i.e. with addition of cupric naphthenate in the same quantities and at the same times as in the first experiment) but without the addition of triphenyl phosphite. The rate of isomerisation was calculated and compared with that in the first experiment (see Table II).

TABLE II

[Rates of isomerising of 1,4-dichlorobutene-2 into 3,4-dichlorobutene-1 in g./100 g. reactor volume/hr.]

| Hours from start of experiment | 40 | 50 | 60 | 70 | 80 | 90 |
|---|---|---|---|---|---|---|
| Triphenyl phosphite: | | | | | | |
| 3% | 7.90 | 8.40 | 8.85 | 9.05 | 9.10 | 9.15 |
| None | 6.90 | 7.25 | 7.45 | 7.40 | 6.85 | 5.80 |
| Percent improvement in rate achieved by addition of 3% triphenyl phosphite | 14.5 | 15.9 | 18.8 | 22.3 | 32.8 | 57.8 |

We claim:

1. A process for the isomerisation of 1,4-dichlorobutene-2 to 3,4-dichlorobutene-1 or for the isomerisation of 3,4-dichlorobutene-1 to 1,4-dichlorobutene-2, comprising contacting the compound to be isomerised at a temperature of from about 80° to 160° C. with a catalyst essentially consisting of (a) one or more compounds of copper selected from the group consisting of the chlorides, acetates and naphthenates of copper, and (b) a phosphorus compound selected from the group consisting of dialkyl-, trialkyl-, diphenyl- and triphenyl-phosphites, phosphates, phosphine oxides, ethyl phosphonates and phosphines wherein the alkyl groups contain 1 to 4 carbon atoms, said phosphorus compound being present in an amount of between 0.5 and 10% by weight of the total weight of dichlorobutenes and catalyst present in the reaction mixture, and separating and recovering the desired dichlorobutene isomer.

2. A process according to claim 1, wherein said copper compound is one or more of cuprous chloride, cupric chloride, and cupric acetate.

3. A process as defined in claim 1 wherein said copper compound is cuprous chloride or cupric naphthenate.

4. A process according to claim 1 wherein the compound of copper in the catalyst composition is cupric naphthenate.

5. A process according to claim 1 wherein the compound of copper in the catalyst composition is cuprous chloride.

6. A process according to claim 1, wherein the organic phosphorus compound is selected from the group consisting of dimethyl phosphite, diethyl phosphite, triethyl phosphate, tributylphosphate, diphenyl phosphite diethylethyl phosphonate, diethyl phosphate, triphenyl phosphite, triethyl phosphite, tributyl phosphite, triallyl phosphite, triisopropyl phosphite, tributyl phosphine oxide, triphenyl phosphine oxide and triphenyl phosphine.

7. A process as defined in claim 3 wherein said phosphorus compound is triphenyl phosphite.

8. A process as defined in claim 3 wherein said phosphorus compound is dimethyl phosphite.

9. A process as defined in claim 3 wherein said phosphorus compound is triphenylphosphine oxide.

10. A process as defined in claim 3 wherein said phosphorus compound is diethylethylphosphonate.

11. A process as defined in claim 3 wherein said phosphorus compound is tributylphosphine oxide.

12. A process as defined in claim 3 wherein said phosphorus compound is triethylphosphate.

13. A process according to claim 1 wherein the isomerisation is carried out at a temperature in the range of 100° to 130° C.

References Cited

UNITED STATES PATENTS 2,446,475   8/1948   Hearne et al. _____ 260—654 R

FOREIGN PATENTS 1,326,286   3/1963   France _____ 260—654 R
1,802,385  11/1969   Germany _____ 260—654 R
   20,330   9/1969   Japan _____ 260—652.5 R LEON ZITVER, Primary Examiner J. A. BOSKA, Assistant Examiner U.S. Cl. X.R.

252—429, 431

UNITED STATES PATENT OFFICE
CERTIFICATE OF CORRECTION

Patent No. 3,830,858          Dated   August 20, 1974

Inventor(s)  PETER JOHN NICHOLAS BROWN and CLIFFORD WILLIAM CAPP

It is certified that error appears in the above-identified patent and that said Letters Patent are hereby corrected as shown below:

Col. 3, line 41, "reacted" should read --heated--

Signed and sealed this 24th day of December 1974.

(SEAL)
Attest:

McCOY M. GIBSON JR.
Attesting Officer

C. MARSHALL DANN
Commissioner of Patents